May 25, 1965 — S. W. PEEL — 3,184,803

PET DOOR

Filed July 25, 1962

INVENTOR.
Stuart W. Peel
BY
Scofield, Kokjer, Scofield & Lowe
ATTORNEYS.

United States Patent Office 3,184,803
Patented May 25, 1965

3,184,803
PET DOOR
Stuart W. Peel, 10201 Dearborn Drive,
Overland Park, Kans.
Filed July 25, 1962, Ser. No. 212,272
1 Claim. (Cl. 20—16)

This invention relates to inlet and outlet doors or ports for pets from houses or dwellings and refers more particularly to such ports or doors which have magnetic means associated therewith adapted to normally maintain the door in a closed position yet which permit free inward or outward motion of the door without utilization of a latch means.

Numerous pet access doors or ports have been previously provided of various types and structures. Such include spring loaded doors adapted to remain in a normally closed position, latch employing doors of various constructions (spring and latch doors generally being adapted only for one-way operation), free swinging hinge mounted doors and overlapping concentric flexible leaf constructions. All of these doors or port types have considerable disadvantages and drawbacks which make them inadvisable or inconvenient for use as pet doors. Thus, for example, unless a port or door for a pet opens or operates in both directions, the owner must intervene to let the pet in or out in the direction in which the door will not operate. Secondly, latching doors are often too complex and too difficult for the pet to operate in either direction. In spring loaded doors, a weak action of the spring or springs tend to leave the door ajar, while too strong action may injure the pet or be noisy. Spring doors work well only if operating in one direction. A simple free hanging swinging door has many advantages, but, in the case of any differential in air pressure between the inside and outside of the house or any breeze or wind action, the door tends to open at least to some degree in one direction or the other, which is not desirable for many reasons, including the access of insects, loss of heat or air conditioning from the house, or the like. Any door without two-way pet controlled action is undesirable. In the overlapping leaf construction, the wear and deterioration is excessive, the weather and pest seal is soon lost, and there is a severe soiling problem.

It is clearly desirable that a pet door construction have a number of particular features. First, it should work both ways by the pet's own action. It should be easily installable in any normal door construction merely by providing a proper size opening in the lower portion of the latter. Next, it should be relatively cheap to purchase, attractive in appearance, simple to operate for the pet and have a minimum number of working parts and parts contacted by the pet whereby to minimize wear thereon. Yet further, such a door should have some means for normally maintaining it in a fully closed position without gaps against reasonable air drafts, air pressure differentials within and without the dwelling, inadvertent light pressures and the like. All of the parts of the door should be readily accessible for repair, replacement and/or cleaning. Means should be provided, additionally, to lock the door under certain circumstances, such as when the owner is absent from the house with the pet, out of town or the like. This is particularly true in the case of a larger size pet where human access also could be secured through the port or door.

Therefore, an object of the instant invention is to provide a pet door construction which is of the suspended swinging type yet which has convenient, simple, effective means for retaining the door in normally completely closed position.

Another object of the invention is to provide a pet outlet port or door which is simple in construction, attractive in appearance, and effective in operation to achieve all of the above noted desirable features of such a pet port or door.

Another object of the invention is to provide a pet port construction or door having magnetic means associated therewith to maintain the door in normally closed position, which means yet permit both inward and outward swinging action of the door caused by the pet.

Another object of the invention is to provide such a pet port or door construction having magnetic means incorporated therein adapted to maintain the door in normally closed position openable therefrom by the pet and additional means associated therewith for firmly locking and securing the door, when desired, which latter means permits opening of the door only after release of same from inside the dwelling.

Another object of the invention is to provide a pet outlet door construction which may be provided either as a frame swinging door combination construction adapted to be inset as a unit into an opening in a dwelling door or, alternatively, where the swinging door alone may be inset into a dwelling door opening and magnet means provided to be associated therewith and with the dwelling door to achieve the objects of the invention.

Another object of the invention is to provide a hinged swinging door and frame combination construction which incorporates therein or thereon all of the means necessary to normally maintain the door in closed position yet permit the pet to go readily in and out thereof, maintain the door in said closed but pet openable position against all but extreme drafts and pressure differentials between the dwelling and the outside and, finally, securely lock the door relative to the frame when desired by the owner.

Another object of the invention is to provide a pet port construction or door wherein the door is self-centering within its frame opening.

Another object of the invention is to provide a pet port construction or door comprising a hollow frame mounting a swinging, vertically suspended door wherein means are provided to assure an air-tight seal of the frame to whatever surface mounts it.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Figure 1:
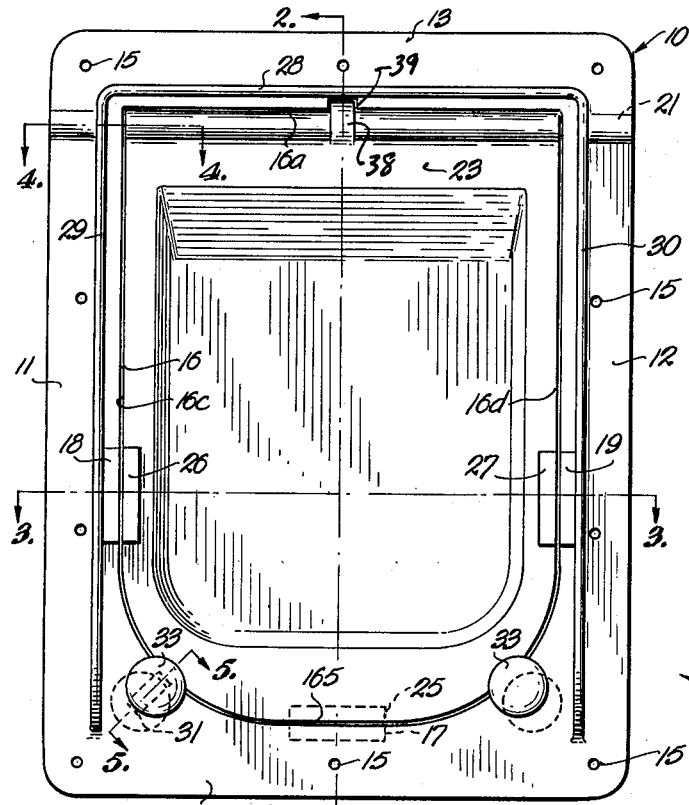
FIG. 1 is a front view (from the outside) of a pet door or port construction comprising a swinging door mounting frame and the door pivotally carried thereby.

Referring to the drawings, a frame generally designated 10 is provided having side walls 11 and 12, top wall 13 and bottom wall 14. Frame 10 has an inner (to the house or dwelling or door thereof on which it is to be mounted) side 10a and an outer side 10b. A plurality of bolt or screw openings 15 are provided at spaced intervals through the frame sides. Frame 10 additionally has a central pet access passage or opening 16, preferably although not necessarily essentially rectangular in shape, having a top edge 16a, a lower edge 16b and side edges 16c and 16d. The corners of the lower edge are preferably rounded off, as shown. Frame 10 itself is preferably also rectangular in shape although it may be any desired outside configuration. The frame is preferably of a size or area concentrically or circumferentially larger than the size or area of the opening provided therefor in the dwelling wall or door so that the peripheral edge portions thereof carrying openings or passages 15 there-through will overlie the edges of the said dwelling wall door opening whereby to be readily secured thereto by bolts or screws connecting thereto.

Either embedded in or connected to one face of the frame 10 (in the latter case, preferably the outer face 10b) are one or more magnets or portions of a magnetizable substance as seen at 17, 18 and 19. Magnet or magnetizable material portion 17 shown embedded is provided centrally of the bottom side 14 next opening 16 while magnets or magnetizable material portions 18 and 19 are provided adjacent opening 16 on frame side walls 11 and 12 preferably spaced slightly above lower wall 14. By magnetizable material portion or substance is meant some material such as soft iron which will be attracted to a magnet placed next thereto. In the event that magnets or portions of magnetizable substance 17–19, inclusive, are embedded in the walls 14, 11 and 12, respectively, the edge portions thereof should face outwardly on opening 16 in line with the edge of the opening on each side thereof thus to provide a continuous unbroken edge of the opening.

Passages or openings 20 and 21 are provided in the upper portions of side walls 11 and 12, immediately below upper wall 13 whereby to mount elongate rods 22 therein of steel or other suitable strong material. Rods 22 are spaced sufficiently downwardly from upper edge 16a of opening 16 whereby to be each engageable by one side of the upper end of a flap or suspend door 23. Door 23 is received in opening 16 and preferably is of substantially closely congruent form therewith whereby to quite closely yet movably fit therein. As clearly seen in FIG. 2, door 23, hinged at it upper end at 24, may move or swing either inwardly or outwardly of frame 10 to permit the pet to enter or leave the house.

Figure 2:
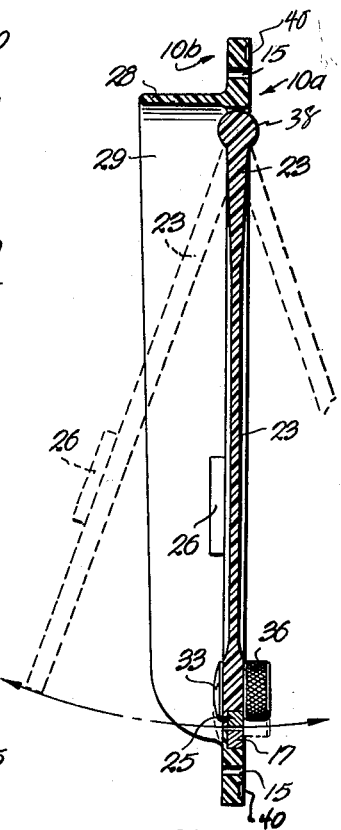
FIG. 2 is a view taken along the line 2—2 of FIG. 1 in the direction of the arrows.

Magnets 25, 26 and 27, or portions of magnetizable substance, same numbers, are provided adjacent to and opposed to magnets or portions of magnetizable substances 17, 18 and 19 on the door frame. Member 25 is shown embedded, the others not. At least one of each opposed pair of magnet or magnetizable members 17–25, 18–26 and 19–27 must be a magnet, while the other opposed member of each pair is either a portion of magnetizable substance, such as soft iron, or a paired, opposed magnet with its poles so arranged next its pair that the adjacent magnets attract one another. In the event that magnets 17–19, inclusive, are on the outer surface of the frame 10, then, preferably, magnets 25–27, inclusive, are fixed to the outer surface of door 23 whereby the latter will hang vertically as seen in FIG. 2 when the magnets are precisely opposed. On the other hand, if magnets 17–19, inclusive, are embedded in frame 10 with their inner edges, only, exposed, then magnets 25–27 are preferably received in the lower and side edges of the door (which in such case is preferably of equal thickness with frame 10) so that the adjacent edges of opposed magnets or magnet-magnetic substance pairs can reside next to one another in closest attraction. The magnets or portions of magnetic substance may be brazed or welded into the door and frame if the latter are metal or attached by plastic-metal glue or other like means if the door and/or frame are plastic. In the case of plastic, the magnets may optionally be integrally molded into the plastic frame and/or door. (Can be molded into any non-magnetic substance.)

The number and positioning of the magnet pairs is not critical, although it is desirable that a sufficient number of magnet pairs of sufficient size and strength be provided to maintain the door normally closed under the conditions which are operating in the given location such as wind loads, internal-external pressure differentials with respect to the dwelling and outside thereof, inadvertent small pressures and the like. To achieve the most efficient action, at least one magnet pair on free edge 16b of the door opposite the hinge is preferable with any side edge magnets positioned, preferably, for the greatest efficiency, closest to the free edge of the door. Alternatively, the side edge pairs may be employed without an end edge pair.

In order to reduce and control wind loads on the door, an enclosing hood or flange is provided having an upper over-lying flange or strip portion 28 and side flange portions 29 and 30. Overlying portion 28 is preferably positioned quite close to upper opening edge 16a with side flange portions 29 and 30 preferably positioned as close to magnets 18 and 19 as feasible. The outward extension of the hood members may be varied as desired. The length of side flange members 29 and 30 is preferably at least equal to the length of door opening 16.

Means are further preferably provided to permit secure latching and engaging of the swinging door when the owner is out of town, overnight once the pet is in, if the owner so prefers because of extreme weather conditions and the like. Such means must preferably not interfere with the normal action of the door. To accomplish this, slots 31 (see FIG. 5) are preferably provided adjacent the lower corners of the door opening to receive therethrough bolt shafts 32. Slots 31 are preferably rectangular on one side thereof (see FIG. 1) and oval on the other side. Shafts 32 have on one (outer) end thereof enlarged flat heads 33 and are externally threaded at the other end thereof as at 34. Square or rectangular shaft portion 34 fits slidingly into the rectangular slot portion whereby to not rotate therein. Knurled nut 36 permits release and tightening of the locking means to operate or fix same. When not in use, shafts 32 are positioned at the outer (from opening 16) extremities of slots 31 whereby enlarged heads 33 and nuts 36 associated therewith are in positions as seen in dotted lines in FIG. 1, namely, not overlying the door 23 lower edge. On the other hand, when it is desired to lock door 23, shafts 32 are moved (from the inside by grasping nuts 36) to the full line position in FIG. 1 (also FIG. 5) whereby enlarged heads 33 and nuts 36 overlie the outer and inner faces of door 23, respectively, as shown. Door 23 is preferably of equal thickness with the frame at its edges as shown, whereby no play whatsoever between nuts 36 and enlarged heads 33 takes place after the door is locked.

Figure 4:
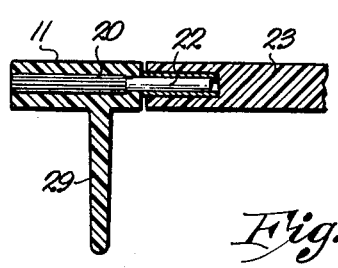
FIG. 4 is a view taken along the line 4—4 of FIG. 1 in the direction of the arrows.

As may be clearly seen in FIGS. 1 and 4, the upper edge of the door 23 is preferably slightly rounded along its upper edge (conveniently molded so if door 23 is plastic) whereby to provide ample thickness to receive the shaft portions 22 therein. Sleeves 37 preferably surround smooth shaft portions 22 as bearings. Sleeves 37 may extend into the very slight gap between the door and frame, but preferably do not do so. The latter makes for and permits a much tighter door-frame fit in order to control insect and weather movement in and out. The portions of the frame adjacent the top carrying shaft portions 20 may be enlarged, also, as shown, if preferred.

The means for centering the door in the opening and on the shafts supporting same at the top thereof preferably comprises a rounded or semi-cylindrical enlargement 38 (preferably molded or formed integrally with the top edge of the door and most clearly seen in FIGS. 1 and 2) which fits, above the door upper edge, into a slot or recess 39 congruent therewith, the slot 39 formed in upper edge 16a of opening 16. Enlargement 38 (seen in FIG. 2) should be carefully differentiated from the rounding of the door upper edge on each side thereof, which is of lesser magnitude. Enlargement 38 extends above the level of the door upper edge whereby to fit closely into slot or recess 39 and aids and effects centering of door 23 in opening 16.

On the inner side of the frame and peripheral to the operating parts of the door is preferably provided a continuous groove or recess 40 adapted to receive a continuous washer or gasket of rubber, plastic or other suitable resilient material whereby to achieve a weather and air-tight fit of the frame against the door or wall surface on which it is mounted. The gasket is not shown, but is of simple rectangular form, hollow centered, to fit continuously in the continuous circumferential groove 40 concentric of the door opening.

Figure 3:
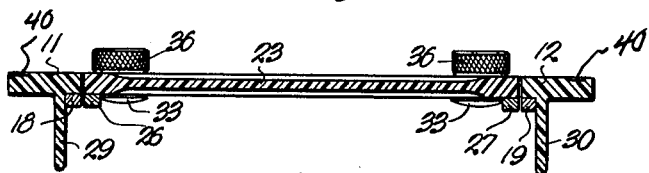
FIG. 3 is a view taken along the line 3—3 of FIG. 1 in the direction of the arrows.

Door 23 may be and preferably is symmetrically recessed on each side thereof for weight saving as may clearly be seen in FIGS. 1, 2 and 3, it being important that the concentric rim or edge of the door be of the same thickness as that of the frame. Of very great and desirable importance is a preferred modification wherein the door itself is made transparent (as of methyl methacrylate, clear polyethylene, other transparent but tinted plastic, safety glass, etc.) whereby the pet can see into the dwelling or out thereof. Alternatively, only a portion of the door may be transparent with the rest translucent or opaque. The frame itself may be transparent, if desired, but, alternatively, may be translucent or opaque.

Figures 5, 6:
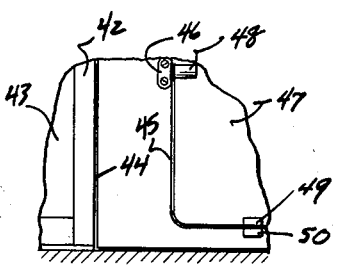
FIG. 5 is a view taken along the line 5—5 of FIG. 1 in the direction of the arrows.
FIG. 6 is a fragmentary front perspective (from the outside) of a dwelling door itself mounting a pet port door in the manner contemplated by the instant invention.

The rounding of the lower portion of the door is preferred, as particularly seen in FIG. 1, to protect the pet from any sharp edges, but, additionally, to provide space for symmetrical locking devices as seen in FIG. 1 and FIG. 5.

Any magnet is preferably faired or rounded into the frame or door surface mounting same, if not embedded therein, to protect the pet. This is particularly important in the magnets at the base of the door, if employed there, as seen at 25 and 17 in FIGS. 1 and 2. Here this positioning means is most preferably embedded as shown. It should be realized that the pet generally will operate the door with its nose and it is not desired to have any sharp edges accessible to injure or scrape it.

FIG. 6 shows a conventional dwelling door 41 of wood or other material set in a door frame 42 attached to the house proper 43 with the opening for the door designated at 44. Although this is definitely not preferred, an owner may cut an opening 45 therein and provide any suitable fitting of conventional type 46 to carry a shaft (not shown) to mount swinging flap door 47 (of the type previously described at 23) with the shaft connection at 48. Door 47 preferably is closely congruent with opening 45. Faired magnet means 49 and 50 are provided in the flap door and dwelling door, respectively, to position the former with respect to the latter in the manner described. Locking means may be employed in the manner shown in FIG. 1, but as such would be identical to the structure shown, so is not duplicated in the drawing. Additional magnets may be employed inset in the side of the door opening as previously shown. Because of the difficulty and problem in mounting the magnets and door mounting shafts in the dwelling door proper, as well as the locking means, the FIG. 6 structure is definitely not preferred, as a frame construction (as seen as a complete assembly in FIGS. 1-3) containing all of the elements may be purchased as a unit and merely screwed or bolted onto the door by means of the openings 15. Matching of the pet door rim thickness and dwelling door panel thickness is another problem.

In operation, the purchaser of the door-frame combination seen in the figures, cuts an opening in the lower portion of a dwelling door or other preferred place in the dwelling dog house, pet house or kennel of a size uniformly less than the outer size or area of the frame and of similar shape. He then bolts or screws frame 10 to the dwelling door covering the opening. The locking means are placed in the unlocked position (dotted line position FIG. 2) and the pet has then free access into and out of the dwelling. If he desires to lock the pet access-way, he merely loosens nut 36 and moves the shafts 32 into the full line position of FIG. 2 on each side to effectively lock same. Wind shield flanges 28–30 operate to deflect a considerable portion of breezes having a side component relative to the door itself.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

A pet outlet door comprising, in combination, a frame, said frame having an opening therein enclosed thereby, said frame adapted to be normally positioned in a vertically oriented plane whereby to have upper and lower edges thereof connected one to the other by side edges, a door pivotally mounted adjacent the upper portion thereof relative to said frame and in the opening thereof, said door adapted to substantially fill said opening, the lower portion of said door freely swingable through and past both sides of said frame, magnetically attracting means attached to each one of said frame and door and cooperating in close proximity with one another to normally retain the latter solely by magnetic attraction in the same vertical plane as the frame and closing off the opening therein while permitting said freely swingable action thereof, an additional means for securing the door lower edge against pivotal movement within said opening, said door lower edge securing means comprising at least one slot in said frame adjacent said opening therein, a shaft movable to and fro in said slot, an enlarged head on one end of said shaft, the other end thereof externally threaded, and enlarged head means for threadably engaging said externally threaded end of said shaft, the enlarged shaft head and enlarged head engaging means each adapted to overlie the door edge on opposite sides thereof when the shaft is at one end of said slot.

References Cited by the Examiner

UNITED STATES PATENTS

| | | | |
|---|---|---|---|
| 229,502 | 6/80 | Wagner | 20—16 |
| 1,111,016 | 9/14 | Fohman | 20—16 |
| 2,138,514 | 11/38 | Shoemaker | 292—175 |
| 2,153,206 | 4/39 | Pease | 292—149 X |
| 2,203,580 | 6/40 | Ronning | 292—251.5 X |
| 2,614,021 | 10/52 | Giffard | 20—16 X |
| 2,758,646 | 8/56 | Johnson. | |
| 2,839,791 | 6/58 | Lee | 20—16 |
| 2,984,510 | 5/61 | Hoffmann | 292—251.5 X |
| 3,115,685 | 12/63 | Wheeler et al. | 20—16 |

FOREIGN PATENTS 1,068,908    France.

HARRISON R. MOSELEY, *Primary Examiner.*

NORTON ANSHER, *Examiner.*